United States Patent [19]
Lebl

[11] Patent Number: 5,939,041
[45] Date of Patent: Aug. 17, 1999

[54] PROCESS AND APPARATUS FOR REMOVING METAL OXIDE PARTICLES IN THE REGENERATION OF PICKLING ACIDS

[75] Inventor: Albert Lebl, Vienna, Austria

[73] Assignee: Andritz-Patentverwaltungs-Gesellschaft M.B.H., Austria

[21] Appl. No.: 08/960,288

[22] Filed: Oct. 29, 1997

[30] Foreign Application Priority Data

Oct. 30, 1996 [AT] Austria .................................... 1889/96

[51] Int. Cl.⁶ .............................. C01B 7/07; B01D 47/10
[52] U.S. Cl. ............................. 423/488; 95/234; 96/275; 96/323; 96/355; 422/182; 423/DIG. 1
[58] Field of Search .............................. 95/214, 216, 219, 95/234, 224; 96/273, 275, 267, 243, 301, 322, 323, 355; 423/488, DIG. 1; 422/182

[56] References Cited

U.S. PATENT DOCUMENTS

| | | | |
|---|---|---|---|
| 3,310,435 | 3/1967 | Robinson, Jr. et al. | 423/DIG. 1 |
| 3,399,964 | 9/1968 | Michels et al. | 423/DIG. 1 |
| 3,445,284 | 5/1969 | Robinson, Jr. et al. | 423/DIG. 1 |
| 3,502,432 | 3/1970 | Phelps | 423/DIG. 1 |
| 3,578,401 | 5/1971 | Ueberle et al. | 423/DIG. 1 |
| 3,607,482 | 9/1971 | Selm | 156/19 |
| 3,745,207 | 7/1973 | Hansen | 423/DIG. 1 |
| 4,049,788 | 9/1977 | Bierbach et al. | 423/DIG. 1 |
| 4,083,693 | 4/1978 | Hansen | 423/DIG. 1 |
| 4,107,267 | 8/1978 | Hansen | 423/DIG. 1 |
| 4,255,407 | 3/1981 | Puurunen | 423/390 |
| 4,469,493 | 9/1984 | Tuovinen et al. | 95/224 |
| 4,663,145 | 5/1987 | Van Den Berk et al. | 423/DIG. 1 |
| 5,076,884 | 12/1991 | Aguilar et al. | 156/642 |
| 5,087,432 | 2/1992 | Hansen | 95/214 |
| 5,178,653 | 1/1993 | Lilja et al. | 55/238 |
| 5,582,634 | 12/1996 | Burdis | 95/174 |

*Primary Examiner*—Duane S. Smith
*Attorney, Agent, or Firm*—Roylance, Abrams, Berdo & Goodman, L.L.P.

[57] ABSTRACT

A process is disclosed for removing the very fine oxide particles produced during regeneration of used pickling acids by pyrolysis. The process includes the step of spraying water into the gaseous stream to produce a mist of fine droplets and thereafter passing the gaseous stream through a liquid separator. The invention is also directed to a plant for carrying out the process where the plant includes a nozzle to spray water droplets into the gaseous stream before the drop separator.

20 Claims, 3 Drawing Sheets

PROCESS AND APPARATUS FOR REMOVING METAL OXIDE PARTICLES IN THE REGENERATION OF PICKLING ACIDS

FIELD OF THE INVENTION

The present invention is directed to a process and apparatus for regeneration of pickling acids by pyrolysis of the spent pickling acid liquor solution. More particularly, the invention is directed to a process and apparatus for removing fine metal oxides and other particles from the exhaust gas stream from the pyrolysis of spent pickling acids.

BACKGROUND OF THE INVENTION

Pickling acids, such as hydrochloric acid and nitric acid, are used in the treatment of various metals. It is common practice to regenerate the acid solutions for reuse in the pickling process.

Pickling acids of hydrochloric acid produce numerous metal chlorides in the spent acid liquor. Many metal chlorides can be thermally converted into metal oxides and hydrogen chloride. The metal oxides then can be separated from the gaseous hydrogen chloride. The hydrogen chloride can be recovered as hydrochloric acid for regenerating the pickling acids.

Various processes are known for regenerating pickling acids. One process for regenerating pickling acids utilizes a roasting technique wherein the spent pickling acid solution from pickling iron or steel is sprayed into a furnace. The hot combustion gases in the furnace vaporize the spent pickling acid and oxidize the metal compounds to form metal oxide particles and hydrogen chloride. Other methods introduce the spent pickling acid into a fluidized bed. The pickling acid can be introduced directly into the fluidized bed. Alternatively, the metal chloride can be separated from the acid solution and then introduced to the fluidized bed as a slurry. One example of a fluidized bed process is disclosed in U.S. Pat. No. 4,049,788.

Fluidized bed and spray roasting processes are generally effective in the regeneration of pickling acids. However, these processes have some disadvantages that are difficult to overcome. For example, fluidized bed and spray roasting processes produce large amounts of fine particles in the gas stream which is very difficult to remove. The exhaust gas stream usually contains large amounts of fine particles of the metal oxides that are discharged to the atmosphere.

Efforts to limit the amount of fine particles of metal oxides discharged into the atmosphere have met with limited success. Various processes have been proposed for removing the fine particles from the gas stream. For example, cyclone separators and venturi washing devices have been used with some success. However, the exhaust gas still contains unacceptable amounts of fine particles. Accordingly, a continuing need exists in the industry for improved processes for regenerating pickling acids.

SUMMARY OF THE INVENTION

The present invention is directed to a process and apparatus for regenerating spent pickling acids. More particularly, the invention relates to a process and apparatus for removing very fine metal oxide particles and other particulates from the exhaust gas stream produced in the pyrolysis of spent pickling acids.

Accordingly, a primary object of the invention is to provide a process and apparatus for recovering fine metal oxide particles and other particulates from an exhaust gas stream.

A further object of the invention is to provide a process and apparatus for reducing the dust and fine particulate emissions in the exhaust gas stream from a spray roasting or fluidized bed pyrolysis chamber in the regeneration of spent pickling acids.

Another object of the invention is to provide a pickling acid regeneration process where a fine spray of water is introduced into the exhaust gas stream and then passing the exhaust gas through a droplet separator.

A still further object of the invention is to provide a process and apparatus for spraying water droplets into an exhaust gas stream containing fine metal oxide particles where the particles adhere to the water droplets whereby micron and submicron size particles can be removed with the droplets.

Another object of the invention is to provide a process and apparatus for producing water droplets having a diameter of about 0.01 mm or less in the exhaust gas stream produced in the regeneration of pickling acids.

A further object of the invention is to provide a process and apparatus for removing fine metal oxide particles in an exhaust gas stream by introducing a fine mist of water droplets into the exhaust gas stream and retaining the water droplets in the exhaust gas stream for at least 0.5 second, and preferably for at least 1 second.

The objects of the invention are basically attained by providing a process of removing oxide particles from exhaust gas produced during the regeneration of pickling acid liquors, said process comprising the steps of spraying a mist of water droplets into an exhaust gas stream obtained from the pyrolysis of pickling acid liquors, wherein said exhaust gas stream contains vaporized acids, water vapor and metal oxide particles, wherein said water droplets are retained in said exhaust gas stream for sufficient time to adhere to said metal oxide particles, and subsequently passing said exhaust gas stream and water droplets to a separator for separating said water droplets and metal oxide particles, and discharging said exhaust gas.

The objects of the invention are further attained by providing a process for the regeneration of spent pickling acids and recovery of metal oxide particles comprising the steps of feeding spent pickling acids to a pyrolysis reactor and pyrolyzing said acids to produce an exhaust gas stream containing metal oxide particles and acid vapors, passing said exhaust gas stream through a first separator to remove a portion of said metal oxide particles, withdrawing said exhaust gas from said first separator and introducing a mist of water droplets into said exhaust gas stream, wherein said water mist is retained in said exhaust gas stream for sufficient time to adhere to a micron and submicron size particles of said metal oxide particles, and subsequently passing said exhaust gas through a second separator and separating said droplets and metal oxide particles, recovering said acid vapors and discharging said exhaust gas.

The objects of the invention are also attained by providing an apparatus for the regeneration of pickling acids and for recovering metal oxide particles, said apparatus comprising: a pyrolysis chamber having a spent pickling acid inlet, an inlet for introducing a fuel to said pyrolysis chamber to pyrolyze said pickling acid and producing an exhaust gas stream containing acid vapors and metal oxide particles; a venturi washer for receiving said exhaust gas stream and for solubilizing said acid vapors and recovering a portion of said metal oxide particles and said solubilized acids; a column separator for receiving said exhaust gas stream and for further separating solubilized acids; a conduit having first end coupled to said column separator; a droplet separator coupled to a second end of said conduit; and a spray nozzle in said conduit for spraying a water mist into said conduit for adhering to the metal oxide particles, whereby said metal oxide particles are removed from said exhaust gas stream in said droplet separator.

These and other objects, advantages and salient features of the invention will become apparent from the annexed drawings and detailed description of the invention.

BRIEF DESCRIPTION OF THE DRAWINGS

Referring to the drawings which form a part of this disclosure in which.

DETAILED DESCRIPTION OF THE INVENTION

The present invention is directed to a process and apparatus for regenerating pickling acids by the pyrolysis of spent pickling acid liquor and recovering the fine oxide particles and other particulates from the exhaust gas stream. More particularly, the invention relates to a process which introduces a fine mist of water droplets into the exhaust gas stream to remove the fine metal oxide particles produced during pyrolysis of an acid liquor in the regeneration of pickling acids.

Figure 1:
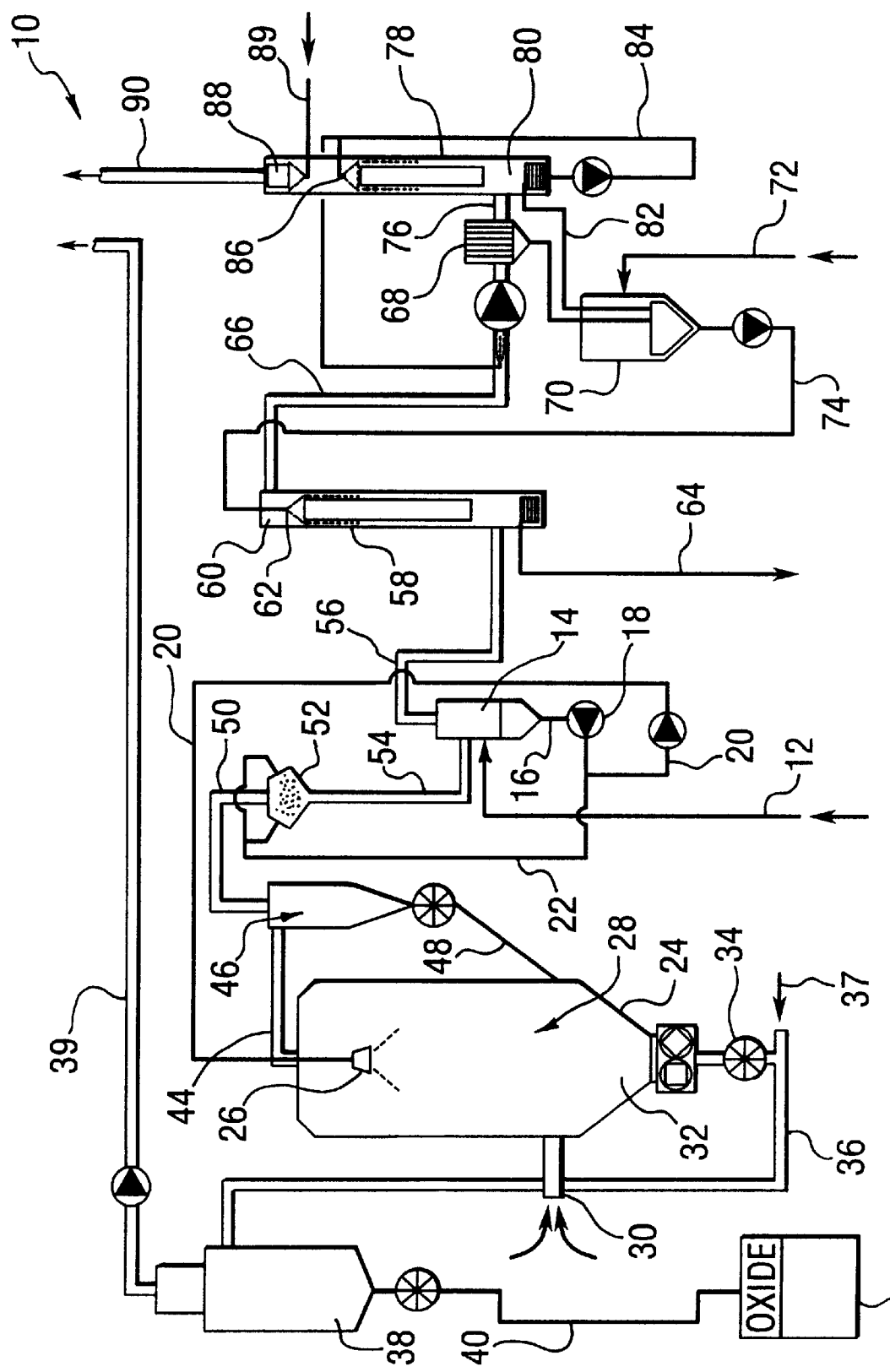
FIG. 1 is a schematic diagram of a pickling acid regeneration plant using a spray roasting pyrolysis furnace.

The process and apparatus are suitable for large scale commercial operations in the regeneration of pickling acid liquors. Referring to FIG. 1, a regeneration plant 10 is illustrated for regenerating spent pickling acids from a metal treatment process. The pickling acids are typically hydrochloric acid, nitric acid and mixtures thereof. Regeneration plant 10 is particularly suitable for the regeneration of hydrochloric acid liquor used for pickling iron and/or steel. The waste pickling liquor from a metal treatment process contains metal salts, such as metal chlorides and metal nitrates, and other impurities from the pickling process.

As shown in FIG. 1, the waste pickling liquor is introduced through pipe 12 to a storage tank or vessel 14. A discharge pipe 16 having a control valve 18 draws the waste pickling liquor from storage tank 14. Pipe 16 divides into a first pipe 20 and second pipe 22. First pipe 20 extends to a pyrolysis reactor 24. In the embodiment illustrated in FIG. 1, pyrolysis reactor 24 is a spray-roasting reactor having a spray nozzle 26 for spraying the pickle liquor into a combustion zone 28. In further embodiments, the reactor can be a fluidized bed reactor as known in the art. A fuel and air mixture is fed through line 30 into the combustion zone 28. The fuel and air mixture burn in the pyrolysis and combustion zone 28 at sufficient temperature to burn and oxidize the waste acid. During the pyrolysis process the metal salts in the waste acid oxidize to produce metal oxide particles while vaporizing the acid compounds, such as hydrogen chloride. The metal oxides produced by the pyrolysis have varying particle sizes depending on the conditions of the pyrolysis process and the reactor.

The heavier metal oxide particles and other particulates produced during the pyrolysis of the pickling liquor fall downwardly to the lower portion 32 of pyrolysis reactor 24 where the particles are discharged through a rotary vane feeder 34. The discharged particles are then conveyed through a pipe 36 to a storage tank 38. Air is introduced to pipe 36 as indicated by arrow 37 to convey the particles to storage tank 38. Storage tank 38 separates the metal oxide particles from the conveying air stream and discharges the particles through a pipe 40 to a vessel 42 for disposal or further processing. The gas portion is discharged from tank 38 through a pipe 39 for discharge to the atmosphere.

The exhaust gas stream from the pyrolysis of the waste pickling acid is withdrawn from pyrolysis reactor 24 through a pipe 44 and directed to a cyclone separator 46. Cyclone separator 46 has a conventional structure and operation as known in the art. The exhaust gas stream carries the small metal oxide particles that do not separate in reactor 24 as well as gaseous materials from the pyrolysis of the pickling liquor. The cyclone separator 46 removes a portion of the metal oxide particles and other solid materials entrained in the exhaust gas stream, and returns the separated particles through line 48 to reactor 24.

The exhaust gas stream carrying small metal oxide particles exit cyclone separator 46 through a pipe 50 to a venturi washer 52. Venturi washer 52 has a structure and operation of conventional venturi washers as known in the art. As shown in FIG. 1, a concentrate of spent pickling acid from storage tank 14 is supplied to venturi washer 52 through line 22. Venturi washer 52 further removes some of the small metal oxide particles entrained in the exhaust gas stream which were not removed in the cyclone separator 46. The exhaust gas stream and pickling liquor mixture is carried through a pipe 54 back to storage tank 14 where the liquid portions combine.

The exhaust gas stream exists storage tank 14 through a pipe 56 to a column separator 58 which can be a packed column. The exhaust gas stream from storage tank 14 carries the fine metal oxide particles, entrained liquids and vapors. Regenerated pickling liquor is introduced to the upper portion 60 of column 58 through a spray nozzle 62. The spray of regenerated acids absorbs some of the acid vapors to recover the acid compounds. The regenerated acid liquor is separated from the gas stream in column 58 and withdrawn through a pipe 64 where the regenerated pickling acid liquor is returned to the pickling process.

The exhaust gas stream from column 58 is carried through a pipe 66 to a heat exchanger 68 where the gas stream is cooled. A portion of acid vapors are condensed as regenerated pickling liquor in heat exchanger 68 and carried to a storage vessel 70. Fresh water is added to storage vessel 70 through line 72 to adjust the concentration of the pickling liquor as desired. A pipe 74 withdraws a portion of the regenerated pickling acid liquor from storage vessel 70 and carries the liquor to spray nozzle 62 in column 58 to separate vapors and particles.

The exhaust gas stream exists heat exchanger 68 through pipe 76 carrying entrained vapors and droplets of various liquids and fine particles of metal oxides and other particulates that are not removed in the cyclone separator 46 and the venturi washer 52. The exhaust gas stream is carried through pipe 76 to a droplet separator 78. In the embodiment illustrated, the drop separator 78 is a packed column where the liquid droplets are separated from the gas stream and flow to a bottom portion 80. A portion of the regenerated pickling acid liquor is carried from bottom portion 80 to storage vessel 70 through a pipe 82. A portion of the regenerated pickling acid liquor in bottom portion 80 is withdrawn through pipe 84 and carried to a spray nozzle 86 in droplet separator 78. Spray nozzle 86 introduces a mist into droplet separator 78 to assist in condensing vapors in the regeneration of the waste pickling acid. A source of fresh water is also introduced to the upper portion 88 of drop separator 78 through pipe 89 to produce a fresh water spray in separator 78 to further recover the regenerated acid. The exhaust gas stream is then discharged through a pipe 90 where the gas is discharged to the atmosphere.

The exhaust gas stream discharged from the drop separator 78 is substantially free of acids and acid by-products but still contains large amounts of fine metal oxide particles as well as other particulates. The pyrolysis of the waste pickling acids produces a portion of metal oxide particles that are not removed in the cyclone separator or venturi washer. These fine metal oxide particles which are not easily removed have a particle size of less than about 1 micron to a few microns which are discharged to the atmosphere with the exhaust gas stream.

Figure 2:
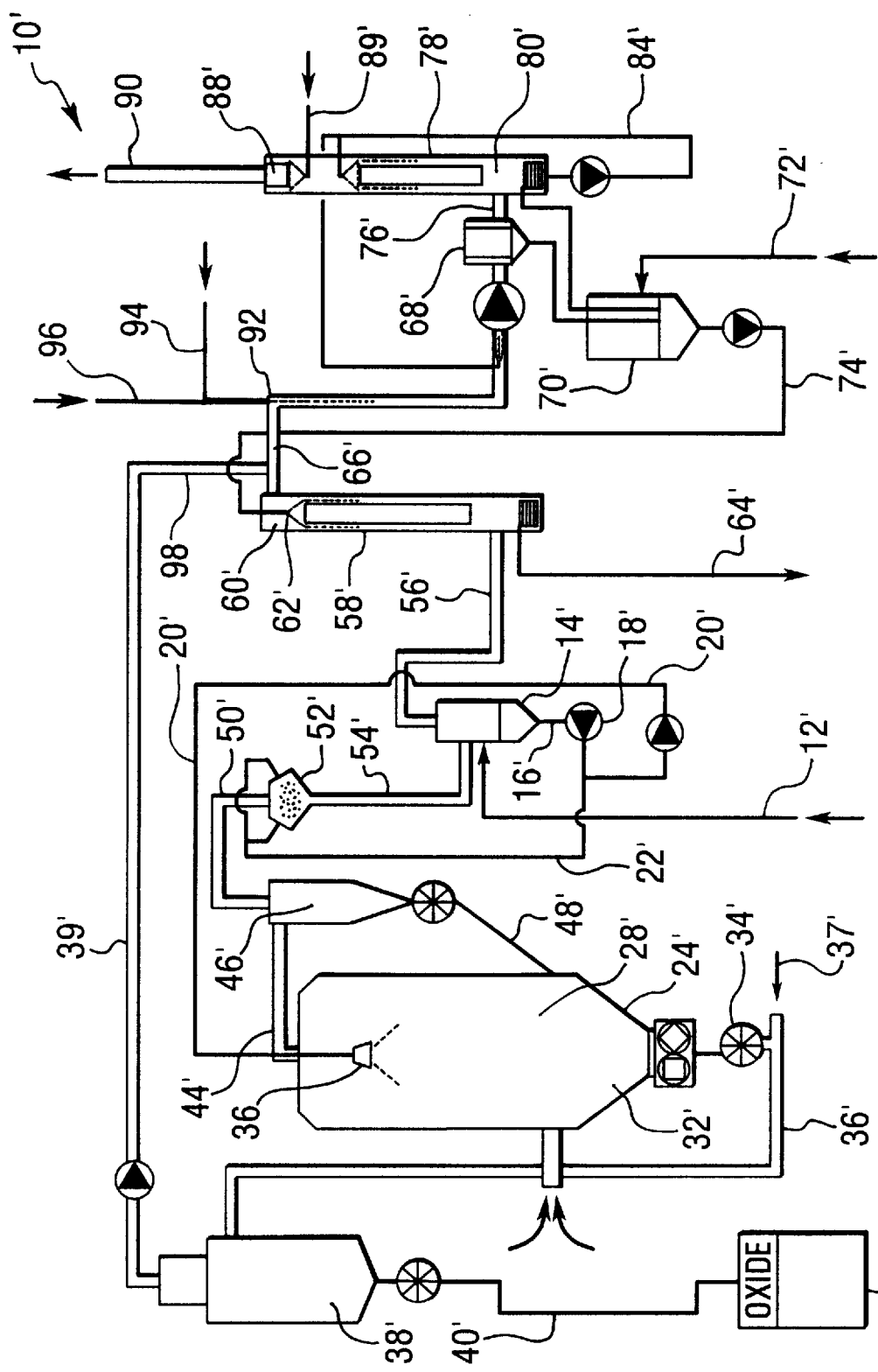
FIG. 2 is a schematic diagram of a pickling acid regeneration plant in an embodiment of the invention.
Figure 3:
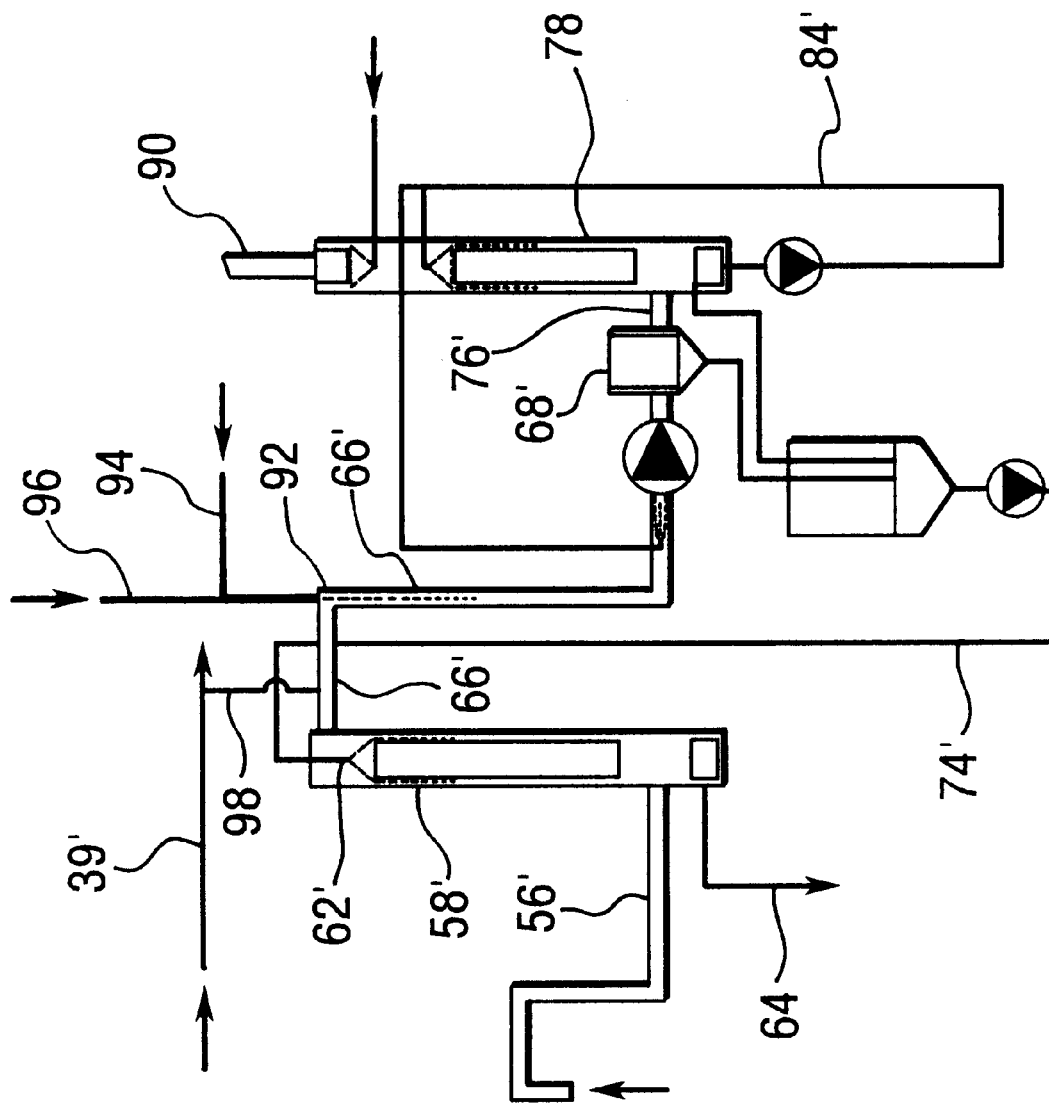
FIG. 3 is a partial enlarged schematic diagram of the pickling acid regeneration plant of FIG. 2.

Referring to FIGS. 2 and 3, a waste pickling acid regeneration plant 10' is shown which is similar to the plant 10 of FIG. 1 except for addition of a water spray nozzle 92 in the system. Accordingly, identical components of the patent are identified by the same reference number with the addition of a prime. As shown in FIGS. 2 and 3, a fresh water supply is supplied through pipe 94 to spray nozzle 92 which is positioned in pipe 66' downstream of separation column 68' and upstream of droplet separator 78'. Spray nozzle 92 produces a mist of water in the exhaust gas stream. Preferably, the nozzle 92 is positioned upstream of heat exchanger 68'.

Nozzle 92 is also connected to a pipe 96 supplying pressurized air to atomize the water spray. The amount of air introduced to the nozzle 92 can vary depending on the nozzle structure and the amount of air desired to be added to the exhaust gas stream since the air will lower the concentration of particulates in the exhaust gas stream. In preferred embodiments, nozzle 92 produces an atomized water mist where the mist has water droplets with an average diameter of about 0.01 mm. The water droplets are introduced into the exhaust gas stream passing through pipe 66' in an amount sufficient to adhere to and agglomerate a substantial portion of the entrained metal oxide particles. In preferred embodiments, the nozzle 92 is positioned in the flow path of pipe 66' and pipe 66' has a length sufficient to retain the water droplets in the exhaust gas stream for at least 0.5 second and more preferably, for at least 1 second. The flow rate of the exhaust gas stream is selected according to the dimension of the pipe 66' to retain the water droplets in suspension for about 0.5 to about 1 second. For example, a retention time of about 0.5 to about 1 second for the water droplets can be easily attained by providing a 10 m pipe 66' and an exhaust gas stream flow rate of about 10 m/sec.

Nozzle 92 is preferably a two component nozzle capable of producing water droplets of about 0.01 mm in diameter or less. In further embodiments, nozzle 92 can be an atomizing spray nozzle or nebulizer as known in the art for producing water droplets having a diameter of 0.01 mm. The water droplets having a diameter of 0.01 mm or less are able to combine with particles of 1 micron or less whereby the micron and submicron size particles attach to and agglomerate with the water droplets. The water spray of droplets measuring 0.01 mm is able to remove particles of less than 1 micron (less than 0.001 mm). In this manner, the micron and submicron size particles adhered to the water droplets are removed from the gas stream in the separator 78'. The volume of water introduced to the exhaust gas stream can vary depending on the particulate concentration and particle size in the gas stream. For example, water can be sprayed into the gas stream at a rate of about 200 liters to about 400 liters per 25,000 Nm$^3$ of exhaust air and generally at a volume of about 300 liters per 25,000 Nm$^3$ of exhaust air. In preferred embodiments, water is introduced into the exhaust gas stream in an amount whereby the exhaust gas stream discharged from the droplet separator has a particulate level of about 50 mg/Nm$^3$ or less.

In the embodiment illustrated, droplet separator 78' is column separator as known in the art for dust collection systems. Preferably, the column is a packed bed separator containing a bed of gravel or other solid material. Alternatively, the column separator can be packed with an alkaline material such as lime. In further embodiments, a venturi washer or scrubber can be used instead of a column separator. In each embodiment the droplet separator is positioned downstream of the fresh water spray 92. As in the embodiment illustrated, the water spray introduced in pipe 66' and carried along the length of the pipe directly to the heat exchanger 68' and then directly to the droplet separator 78'. In further embodiments the heat exchanger can be omitted whereby the water spray in the exhaust gas stream is carried directly to the droplet separator.

The plant assembly 10 shown in FIGS. 2 and 3 is typically capable of reducing the amount of entrained particulates in the exhaust gas stream from the regeneration of pickling acids to a level of less than about 50 mg/Nm$^3$. In further embodiments, the exhaust gas stream from the metal oxide storage tank 38' is fed through a pipe 98 to the pipe 66' upstream of the spray nozzle 92. In this manner, all or a portion of the exhaust gas stream can be treated by the fresh water spray in pipe 66' further to remove micron and submicron size particles by the water spray.

The following non-limiting examples demonstrate preferred embodiments of the invention.

EXAMPLES

Several comparative tests were conducted in a pickling acid regeneration plant substantially as shown in FIGS. 1–3. The waste pickling liquor concentrate from the storage tank was fed to spray roasting reactor 24 at a rate of about 6 m$^3$/hr. About 9 m$^3$/hr of the pickling liquor from the storage tank was fed to the venturi washer 52. The volume of excess air introduced to the exhaust stream was a varied process parameter. The exhaust gas stream produced was about 25,000 Nm$^3$/hr depending on the volume of excess air introduced to the exhaust gas stream. The particulates in the exhaust gas stream discharged from the droplet separator without spraying water into the pipe 84 is shown in Table 1. Fresh water was then sprayed into pipe 66' through the nozzle 92 at a rate of about 300 l/hr to produce water droplets having an average diameter of about 0.01 mm. The water droplets were retained in the exhaust gas stream for at least 0.5 second. The quantity of particulates in the exhaust gas stream discharged from the drop separator are also recorded in Table 1.

TABLE 1

| Test No. | Excess Air λ | Dust in mg/Nm$^3$ without Spray Water | Dust in mg/Nm$^3$ with Water Spray |
|---|---|---|---|
| 1 | 1.45 | 72.5 | |
| 2 | 1.45 | | 41.2 |
| 3 | 1.65 | 35.8 | |
| 4 | 1.65 | | 21.8 |

TABLE 1-continued

| Test No. | Excess Air λ | Dust in mg/Nm³ without Spray Water | Dust in mg/Nm³ with Water Spray |
|---|---|---|---|
| 5 | 1.60 | 47.3 | |
| 6 | 1.60 | | 27.5 |

The test results demonstrate that the water spray into the exhaust gas stream upstream of the droplet separator reduces the particulates an average of about 40% compared to the exhaust gas stream where the water spray is not fed into the exhaust gas stream. In addition, data demonstrates that the water spray having droplets of about 0.01 mm are able to remove submicron size particles that were not able to be removed in the cyclone separator or the vennturi washer.

While several embodiments have been shown to illustrate the invention, it will be understood by those skilled in the art that various modifications and changes can be made therein without departing from the scope of the invention as defined in the appended claims.

What is claimed is:

1. A process of removing oxide particles from exhaust gas produced during the regeneration of pickling acid liquors, said process comprising the steps of
    spraying a mist of water droplets having a diameter of about 0.01 mm or less into an exhaust gas stream obtained from the pyrolysis of pickling acid liquors, wherein said exhaust gas stream contains vaporized acids, water vapor and metal oxide particles, wherein said water droplets are retained in suspension in said exhaust gas stream for sufficient time to adhere to said metal oxide particles, and
    subsequently passing said exhaust gas stream and water droplets to a separator for separating said water droplets and metal oxide particles to remove said metal oxide particles from said exhaust gas stream, and
    discharging said exhaust gas.
2. The process of claim 1, further comprising spraying said mist into said exhaust gas stream whereby said droplets are retained in said exhaust gas stream for at least 0.5 second.
3. The process of claim 1, further comprising spraying said mist into said exhaust gas stream whereby said droplets are retained in said exhaust gas stream for at least 1 second.
4. The process of claim 1, wherein said separator is a venturi washer separator or a column separator.
5. The process of claim 4, wherein said column separator is a column containing an alkaline packing material.
6. A process for the regeneration of spent pickling acids and recovery of metal oxide particles comprising the steps of
    feeding spent pickling acids to a pyrolysis reactor and pyrolyzing said acids to produce an exhaust gas stream containing metal oxide particles and acid vapors,
    passing said exhaust gas stream through a first separator to remove a portion of said metal oxide particles,
    withdrawing said exhaust gas from said first separator and conveying said exhaust gas through a conduit while introducing a mist of water droplets into said exhaust gas stream in said conduit, wherein said water droplets have a diameter of about 0.01 mm or less and are retained in suspension in said exhaust gas stream for sufficient time to adhere to micron and submicron size particles of said metal oxide particles, and
    subsequently passing said exhaust gas and suspension of said water droplets through a second separator and separating said droplets and metal oxide particles from said exhaust gas, recovering said acid vapors and discharging said exhaust gas.
7. The process of claim 6, wherein said first separator is a cyclone separator.
8. The process of claim 6, wherein said first separator comprises a cyclone separator and a venturi washer connected together in series.
9. The process of claim 6, comprising withdrawing said exhaust gas stream from said first separator, spraying said water and pressurized air through a two component nozzle to produce said mist of water droplets.
10. The process of claim 6, wherein said mist is suspended in said exhaust gas stream for at least about 0.5 second before passing through said second separator.
11. The process of claim 6, wherein said mist is suspended in said exhaust gas stream for at least about 1 second before passing through said second separator.
12. An apparatus for the regeneration of pickling acids and for recovering metal oxide particles, said apparatus comprising
    a pyrolysis chamber having a spent pickling acid inlet, an inlet for introducing a fuel to said pyrolysis chamber to pyrolyze said pickling acid and producing an exhaust gas stream containing acid vapors and metal oxide particles;
    a venturi washer for receiving said exhaust gas stream and for solubilizing said acid vapors and recovering a portion of said metal oxide particles and said solubilized acids;
    a column separator for receiving said exhaust gas stream and for further separating solubilized acids;
    a conduit having first end coupled to said column separator;
    a droplet separator coupled to a second end of said conduit; and
    a spray nozzle in said conduit for spraying a water mist into said conduit, said water mist having water droplets with a diameter of about 0.01 mm or less suspended in said exhaust gas stream in said conduit for adhering to the metal oxide particles, whereby said water droplets and metal oxide particles are removed from said exhaust gas stream in said droplet separator.
13. The apparatus of claim 12, wherein said droplet separator is a column separator.
14. The apparatus of claim 12, wherein said conduit has a length sufficient to retain said droplets for at least 0.5 second.
15. The apparatus of claim 12, wherein said conduit has a length sufficient to retain said droplets for at least 1 second.
16. The process of claim 1, further comprising conveying said exhaust gas through a conduit and spraying water and pressurized air through a two component nozzle to produce said mist of water droplets in said conduit.
17. The process of claim 6, further comprising feeding water and pressurized air through a two component nozzle positioned in said conduit and producing said mist of water droplets.
18. The apparatus of claim 12, further comprising a source of pressurized air for supplying pressurized air to said spray nozzle to produce said water mist.
19. The process of claim 1, wherein said mist of water droplets adhere to micron and submicron size particles and remove said micron and submicron size particles from said exhaust gas stream.
20. The apparatus of claim 12, wherein said exhaust gas stream contains micron and submicron size metal oxide particles and said water mist is introduced into said conduit to adhere to said micron and submicron size particles and remove said particles from said exhaust gas.

* * * * *